United States Patent Office 2,830,988
Patented Apr. 15, 1958

2,830,988

2-ARYL-2-AMINO METHYL DIOXOLANE-(1,3) COMPOUNDS AND A PROCESS OF MAKING SAME

Heinz Scheffler and August Kottler, Biberach (Riss), Germany, assignors to Dr. Karl Thomae G. m. b. H., Biberach (Riss), Germany, a corporation of Germany No Drawing. Application September 8, 1955
Serial No. 533,231

Claims priority, application Germany September 10, 1954

14 Claims. (Cl. 260—247.7)

This invention relates to new dioxolane-(1,3) compounds and more particularly to new 2-aryl-2-amino methyl dioxolane-(1,3) compounds, their acid addition salts, and their quaternary ammonium compounds, and to a process of making same.

It is one object of the present invention to provide new and valuable 2-aryl-2-amino methyl dioxolane-(1,3) compounds, their acid addition salts, and their quaternary ammonium compounds, said new compounds possessing valuable pharmacological properties and being useful in a therapy directly aimed at the suppression of hypersecretions that are innervated parasympathetically, such as gastric hypersecretion.

Another object of the invention is to provide a simple and effective process of making said new and valuable 2-aryl-2-amino methyl dioxolane-(1,3) compounds, their acid addition salts, and their quaternary ammonium compounds.

A further object of the invention is to provide compositions useful as agents for blocking the vagal ganglia without substantially affecting the ganglia of the sympathetic nerve and thus being especially suitable for suppressing, by their aimed action upon said vagal ganglia, hypersecretions that are innervated parasympathetically.

Other objects of the present invention and advantageous features thereof will become apparent as the description proceeds.

In principle, the 2-aryl-2-amino methyl dioxolane-(1,3) compounds according to the present invention correspond to the Formula I.

FORMULA I

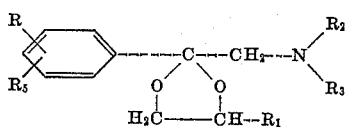

Their acid addition salts and quaternary ammonium compounds correspond to the Formula II.

FORMULA II

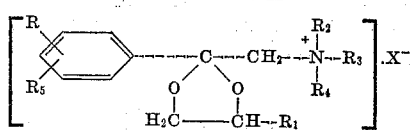

In said formula: R and $R_5$ indicate hydrogen, a hydroxyl group, or a hydroxyl group protected by a carbon skeleton having 1 to 10 carbon atoms; $R_1$ indicates hydrogen or a straight-chain or branched alkyl radical with 1 to 4 carbon atoms; $R_2$ and $R_3$ indicate hydrogen or a straight-chain or branched alkyl radical with 1 to 4 carbon atoms, or a hydroxy alkyl group, or a cycloalkyl radical, or an aralkyl radical. The substituents $R_2$ and $R_3$ may be the same or they may be different from each other. They can also form, together with the nitrogen atom to which they are attached, a four- to six-membered hydrogenated heterocyclic ring which may contain further hetero atoms, such as, for instance, a pyrrolidine, piperidine, or morpholine ring; $R_4$ indicates hydrogen or a straight-chain or branched alkyl radical with 1 to 4 carbon atoms, a cycloalkyl radical, or an aralkyl radical; and X indicates an anionic group, such as the anion of an inorganic or organic acid, and preferably halogen or the alkosulfate anion.

The compounds according to the present invention are preferably produced by reacting 2-aryl-2-halogeno methyl dioxolane-(1,3) compounds of the Formula III.

FORMULA III

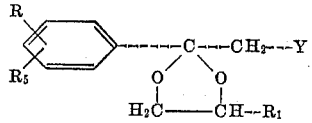

wherein R, $R_1$ and $R_5$ are substituents of the above given definitions and Y indicates halogen and preferably bromine or iodine, at elevated temperature with amines of the Formula IV.

FORMULA IV

wherein $R_2$ and $R_3$ are substituents of the above given definition. Ordinarily condensation of compounds of the Formulas III and IV is effected at a temperature between about 100° C. and about 200° C. and preferably at a temperature between 140° C. and 170° C.

The resulting 2-aryl-2-amino methyl dioxolane-(1,3) compounds can be converted, by subsequent treatment with an acid having the anion X of the above given definition, into their primary, secondary, or tertiary acid addition salts. The tertiary 2-aryl-2-amino methyl dioxolane-(1,3) compounds are also reacted with quaternizing agents, for instance, with an alkylating agent of the Formula V.

FORMULA V

wherein $R_4$ and X are substituents of the above given definition, to produce the corresponding quaternary ammonium compounds of said 2-aryl-2-amino methyl dioxolane-(1,3).

Preferably, the amine of Formula IV, when reacted with the 2-aryl-2-halogeno methyl dioxolane-(1,3) of Formula III, is used in excess. Especially favorable results are achieved when using 2 to 5 mols of amine per mol of halogeno compound. The reaction proceeds either by causing the components to react directly with each other or by operating in the presence of an organic solvent, such as, for instance, ethanol, butanol, and other lower aliphatic alcohols, or benzene, xylene, or other benzene hydrocarbons. The reaction mixture is heated under reflux for several hours depending upon the boiling point of the amine used or the organic solvent which may be present. The reaction mixture can also be heated under pressure in an autoclave. If required, acid binding agents such as, for instance, potassium carbonate or calcium oxide, can be added to the reaction mixture.

A modification of the process of producing 2-aryl-2-amino methyl dioxolane-(1,3) compounds according to the present invention comprises condensing amino ketones of the Formula VI.

FORMULA VI

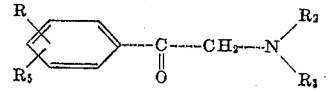

wherein R, $R_5$, $R_2$ and $R_3$ are substituents of the above given definition, or their acid addition salts with glycols of the Formula VII;

FORMULA VII

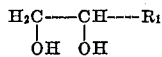

or with epoxides of the Formula VIII;

FORMULA VIII

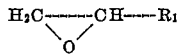

wherein $R_1$ is a substituent of the above given definition, at room temperature or at elevated temperature, in the presence of acid catalysts or condensing agents, for example, of hydrochloric acid, sulfuric acid, glacial acetic acid, acetic acid anhydride, tin tetrachloride, p-toluene sulfonic acid, or the like, thereby causing ring closure of said glycols or epoxides with the keto group to form the dioxolane ring.

Preferably equimolecular amounts of the reaction components of Formulas VI and VII or VI and VIII are dissolved in an inert solvent such as, for example, benzene, xylene, or ligroin, the condensing agent is added thereto, and the mixture is boiled under reflux, if required, for several hours. The reaction water set free when using glycols of Formula VII for reaction with amino ketones of Formula VI can be separated and removed by azeotropic distillation, since said water forms an azeotropic mixture with the solvent added.

Separation and purification of the dioxolane bases, as obtained by proceeding according to the above-described processes, are preferably effected by evaporating the reaction mixture, dissolving the evaporation residue in dilute acid, clarifying the solution, rendering the clear solution alkaline by the addition of alkali hydroxide solution, shaking and extracting the resulting alkaline solution with a water-immiscible organic solvent, such as ether or benzene, evaporating the extract, thereby distilling off the solvent, and distilling the remaining residue in a vacuum.

The acid addition salts, i. e. the primary, secondary, and tertiary salts of the dioxolane bases according to the present invention, are obtained in a simple manner by treating said bases with inorganic or organic acids, for example, with hydrochloric acid, sulfuric acid, or acetic acid, preferably in the cold, under anhydrous conditions, and in the presence of solvents, in which the respective salt is difficultly soluble, for example, in ether or acetic acid ethyl ester.

To produce quaternary ammonium compounds, the tertiary dioxolane bases are mixed with equimolecular amounts or an excess of quaternizing agents, especially of alkylating agents, if desired, with the addition of a solvent in which the resulting quaternary ammonium compound is difficultly soluble, for example, in ether or acetic acid ethyl ester. The mixture is allowed to stand for several hours or is heated in a closed container at temperatures up to 100° C.

The resulting salts and the quaternary ammonium compounds are purified by recrystallization from water or organic solvents, such as ethanol, butanol, other aliphatic alcohols, or acetic acid esters.

As stated above, the new compounds produced according to the present invention possess remarkable pharmacological activity, especially with regard to the autonomous nerve system. Thus, particularly the quaternary ammonium compounds of 2-aryl-2-amino methyl dioxolane-(1,3) compounds, according to the present invention, are of low toxicity and, within a wide range of dosage, have a surprisingly high blocking effect upon vagal ganglia without substantially affecting sympathetic ganglia. In contrast hereto, most of the known ganglia blocking agents first block and thus eliminate the sympathetic ganglia, and only thereafter block the vagal ganglia. As a result of said surprising action which is solely directed to a blocking of the vagal ganglia, the new 2-aryl-2-amino methyl dioxolane-(1,3) compounds, according to the present invention, permit their aimed therapeutic use in suppressing hypersecretions that are parasympathetically innervated, such as gastric hypersecretion.

The 2-aryl-2-halogeno methyl dioxolane-(1,3) compounds of Formula III, used as starting materials in the process according to the present invention, are produced by condensing ω-halogeno acetophenones of the Formula IX.

FORMULA IX

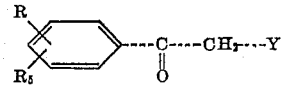

with glycols or, respectively, epoxides of Formulas VII and VIII, under conditions whereby ring closure to the dioxolane ring is effected. In said Formulas VII, VIII and IX, the substituents R, $R_5$, $R_1$ and Y are substituents of the above given definition.

In principle, said condensation and ring closure is effected under about the same conditions as described above for the condensation and ring closure of the corresponding amino ketones of Formula VI with glycols, or epoxides of Formulas VII and VIII.

The following examples serve to illustrate the invention without, however, limiting the same thereto.

*Example 1.—2-phenyl-2-methylamino methyl dioxolane-(1,3) hydrochloride*

5 gm. of 2-phenyl-2-bromo methyl dioxolane-(1,3) are mixed with 5 cc. of a 24% methylamine solution in absolute ethanol. The mixture is heated in an autoclave to 150–160° C. for 24 hours. After cooling, ethanol is evaporated. The remaining residue is dissolved in water and the aqueous solution is extracted with ether. The ethereal solution is washed several times with water and dried over anhydrous sodium sulfate. An ethereal solution of hydrochloric acid in excess is added thereto. The resulting crystalline precipitate is filtered off after cooling and is subsequently recrystallized from a mixture of absolute ethanol and acetic acid ethyl ester (1:3). Melting point: 155–157° C. Yield: About 61–65% of the theoretical yield.

Chlorine determination: Calculated: 15.5%; found: 15.85%.

*Example 2.—2-phenyl-2-morpholino methyl dioxolane-(1,3) hydrochloride*

13.0 gm. of 2-phenyl-2-bromo methyl dioxolane-(1,3) are heated with 9.5 gm. of pure morpholine in a closed vessel to 150° C. for 15 hours. After cooling, water is added to the reaction mixture whereby an oil precipitates. Said oil is extracted with ether. The ethereal solution is washed several times with water and evaporated to dryness. The remaining residue is dissolved in anhydrous ether and a hydrochloric acid solution in anhydrous ether in excess is added to the resulting solution. The resulting crystalline precipitate is filtered off and recrystallized from a mixture of absolute ethanol and acetic acid ethyl ester (1:3). Melting point: 238–239° C. Yield: About 70% of the theoretical yield.

Chlorine determination: Calculated: 12.45%; found: 12.5%.

Said compound is also obtained on boiling under reflux ω-morpholino acetophenone in benzene solution in the presence of p-toluene sulfonic acid for several hours whereby the water set free on reaction is continuously separated and removed by azeotropic distillation with the benzene.

*Example 3.—2-phenyl-2-piperidino methyl dioxolane-(1,3) hydrochloride*

12.2 gm. of 2-phenyl-2-bromo methyl dioxolane-(1,3) are heated with 8.4 gm. of pure piperidine in a closed reaction vessel at 150° C. for 24 hours. The reaction mixture is worked up by following the procedure described in Example 2. Melting point: 235–236° C. Yield: About 75% of the theoretical yield.

Chlorine determination: Calculated: 12.5%; found 12.7%.

*Example 4.—2-(p-methoxy phenyl)-2-morpholino methyl dioxolane-(1,3)*

13.3 gm. of 2-(p-methoxy phenyl)-2-bromo methyl dioxolane-(1,3) are heated with 8.7 gm. of morpholine to 150° C. for 24 hours. After cooling, the reaction mixture is dissolved in equal parts of ether and water and the solution is acidified by the addition of dilute hydrochloric acid. After separating and removing the ethereal solution, the aqueous phase is rendered alkaline by the addition of dilute sodium hydroxide solution. The oil precipitating thereby is extracted with ether or benzene. The ethereal or benzenic extract is washed with water until neutral, dried over anhydrous sodium sulfate, and evaporated to dryness. The remaining residue is distilled in a vacuum. Boiling point: 190–198° C./10 mm. Yield: About 80% of the theoretical yield.

Nitrogen determination: Calculated: 5.03%; found 5.1%.

*Hydrochloride.*—The hydrochloride is prepared by reacting the free base with an excess of a hydrochloric acid solution in anhydrous ether. Melting point: 170° C. Yield: About 90% of the theoretical yield.

Chlorine determination: Calculated: 11.23%; found: 11.14%.

*Example 5.—2-(p-methoxy phenyl)-2-piperidino methyl dioxolane-(1,3)*

13.3 gm. of 2-(p-methoxy phenyl)-2-bromo methyl dioxolane-(1,3) are heated with 8.5 gm. of pure piperidine to 150° C. for 20 hours. The reaction product is worked up by following the procedure described in Example 4. Boiling point: 190–195° C./10 mm. Yield: About 75% of the theoretical yield.

Nitrogen determination: Calculated: 5.05%; found: 5.10%.

*Hydrochloride.*—The hydrochloride is obtained by reacting the free base with an excess of a hydrochloric acid solution in anhydrous ether. Melting point: 157° C. Yield: About 95% of the theoretical yield.

Chlorine determination: Calculated: 11.29%; found: 11.25%.

*Example 6.—2-(p-methoxy phenyl)-2-diethylamino methyl dioxolane-(1,3)*

13.3 gm. of 2-(p-methoxy phenyl)-2-bromo methyl dioxolane-(1,3) are heated with 7.3 gm. of diethylamine to 150° C. in a closed reaction vessel for 24 hours. The reaction mixture is worked up by following the procedure described in Example 4. Boiling point: 160–170° C./9 mm. Yield: About 75% of the theoretical yield.

Nitrogen determination: Calculated: 5.28%; found: 5.30%.

*Methoiodide.*—The free base is allowed to stand with an excess of methyl iodide at room temperature for 4 hours. Melting point of the methoiodide: 170° C. Yield: About 85% of the theoretical yield.

Iodine determination: Calculated: 31.10%; found: 31.12%.

*Example 7.—2-(p-ethoxy phenyl)-2-morpholino methyl dioxolane-(1,3)*

14.35 gm. of 2-(p-ethoxy phenyl)-2-bromo methyl dioxolane-(1,3) are heated with 8.7 gm. of pure morpholine in a sealed tube to 150° C. for 20 hours. The reaction mixture is worked up by following the procedure described hereinabove in Example 4. Boiling point: 200–210° C./10 mm. Yield: About 77% of the theoretical yield.

Nitrogen determination: Calculated: 4.30%; found: 4.90%.

*Hydrochloride.*—The hydrochloride is prepared by reacting the free base at room temperature with an excess of a hydrochloric acid solution in anhydrous ether. Melting point: 155° C. after recrystallization from n-butanol and acetic acid ethyl ester (1:4). Yield: About 88% of the theoretical yield.

Chlorine determination: Calculated: 10.75%; found: 10.56%.

*Methoiodide.*—The methoiodide is obtained by boiling under reflux the free base with an excess of a methyl iodide solution in anhydrous ether for several hours. Melting point: 180° C. Yield: About 85% of the theoretical yield.

Iodine determination: Calculated: 29.16%; found: 29.5%.

*Example 8.—2-(p-ethoxy phenyl)-2-piperidino methyl dioxolane-(1,3)*

14.35 gm. of 2-(p-ethoxy phenyl-2-bromo methyl dioxolane-(1,3) are heated with 8.5 gm. of piperidine to 170° C. for 15 hours. The reaction mixture is worked up by following the procedure described hereinabove in Example 4. Boiling point: 190–198° C./10 mm. Yield: About 80% of the theoretical yield.

Nitrogen determination: Calculated: 4.80%; found: 4.85%.

*Hydrochloride.*—The hydrochloride is prepared by reacting the free base at room temperature with an excess of a hydrochloric acid solution in anhydrous ether. Melting point: 178° C. after recrystallization from acetic acid ethyl ester. Yield: About 90% of the theoretical yield.

*Methoiodide.*—The methoiodide is obtained by allowing the free base to stand at room temperature with an excess of methyl iodide for several hours. Melting point: 172° C. Yield: About 69% of the theoretical yield.

Iodine determination: Calculated: 29.28%; found: 29.5%.

*Example 9.—2-(p-ethoxy phenyl)-2-diethylaminomethyl dioxolane-(1,3)*

14.35 gm. of 2-(p-ethoxy phenyl)-2-bromo methyl dioxolane-(1,3) are heated in a sealed tube with 7.3 gm. of diethylamine to 150–160° C. for 20 hours. The reaction mixture is worked up by following the procedure described hereinabove in Example 4. Boiling point: 170–180° C./10 mm. Yield: About 76% of the theoretical yield.

Nitrogen determination: Calculated: 5.02%; found: 5.1%.

*Hydrochloride.*—The hydrochloride is prepared by reacting the free base at room temperature with an excess of a hydrochloric acid solution in anhydrous ether. Melting point: 140° C. after recrystallization from acetic acid ethyl ester. Yield: About 88% of the theoretical yield.

Chlorine determination: Calculated: 11.22%; found: 11.5%.

*Methoiodide.*—The methoiodide is obtained by allowing the free base to stand at room temperature with an excess of methyl iodide for several hours. Melting point: 130° C. Yield: About 79% of the theoretical yield.

Iodine determination: Calculated: 30.12%; found: 30.5%.

*Example 10.—2-(p-butoxy phenyl)-2-morpholino methyl dioxolane-(1,3)*

7.7 gm. of 2-(p-butoxy phenyl)-2-bromo methyl dioxolane-(1,3) are heated in a sealed tube with 7 gm. of morpholine to 160–165° C. for 20 hours. The reaction mixture is worked up by following the procedure described in Example 4. Boiling point: 215–225° C./10 mm. Yield: About 85% of the theoretical yield.

Nitrogen determination: Calculated: 4.37%; found: 4.5%.

*Hydrochloride.*—The hydrochloride is prepared by reacting the free base with 20% aqueous hydrochloric acid in the cold. Melting point: 184° C. after recrystallization from water. Yield: About 65% of the theoretical yield.

Chlorine determination: Calculated: 9.9%; found: 10.23%.

*Methoiodide.*—The methoiodide is prepared by heating the free base with an excess of methyl iodide to 30° C. for 20 hours. Melting point: 197–199° C. after recrystallization from water. Yield: About 95% of the theoretical yield.

Iodine determination: Calculated: 27.41%; found: 27.2%.

*Methobromide.*—The methobromide is prepared by allowing the free base and an excess of methyl bromide to stand in an autoclave at room temperature for 24 hours. Melting point: 199–200° C. after recrystallization from methanol. Yield: About 90% of the theoretical yield.

Bromine determination: Calculated: 19.2%; found: 18.75%.

*Methosulfate.*—The methosulfate is prepared by allowing equimolecular amounts of the free base and of dimethyl sulfate in water-free ethereal solution to stand at room temperature for 18 hours. Melting point: 131–133° C. after recrystallization from anhydrous acetic acid ethyl ester. Yield: About 65% of the theoretical yield.

*Ethobromide.*—The ethobromide is prepared by heating the free base and an excess of ethyl bromide in an autoclave to 50–60° C. for 30 hours. Melting point: 196–197° C. after recrystallization from a mixture of butanol and acetic acid ethyl ester (1:2). Yield: About 85% of the theoretical yield.

Bromine determination: Calculated: 18.6%; found: 18.7%.

*Example 11.—2-(o-butoxy phenyl)-2-morpholino methyl dioxolane-(1,3)*

47.7 gm. of 2-(o-butoxy phenyl)-2-bromo methyl dioxolane-(1,3) are heated with 39.2 gm. of morpholine to 150–160° C. for 18 hours. The reaction mixture is worked up by following the procedure described in Example 4. Boiling point 137–139° C./0.01 mm. Yield: about 68% of the theoretical yield.

Nitrogen determination: Calculated: 4.30%; found 4.49%.

Said base yields a clear solution in dilute aqueous acids.

*Hydrochloride.*—The hydrochloride is prepared by reacting the free base with a hydrochloric acid solution in anhydrous ether in the cold. Melting point: 181–182° C. after recrystallization from isopropanol. Yield: about 85% of the theoretical yield.

Chlorine determination: Calculated: 9.96%; found: 9.6%.

*Methoiodide.*—The methoiodide is prepared by allowing the free base to stand at room temperature with an excess of methyl iodide for several days. Melting point: 205° C. after recrystallization from water. Yield: about 90% of the theoretical yield.

Iodine determination: Calculated: 27.4%; found: 27.0%.

*Example 12.—2-(o-butoxy phenyl)-2-morpholino methyl-4-methyl dioxolane-(1,3)*

49.4 gm. of 2-(o-butoxy phenyl)-2-bromo methyl-4-methyl dioxolane-(1,3) are heated with 39.2 gm. of morpholine to 150–160° C. for 18 hours. The reaction mixture is worked up by following the procedure described hereinabove in Example 4. Boiling point: 144–146° C./0.01 mm. Yield: about 65% of the theoretical yield.

Nitrogen determination: Calculated: 4.18%; found: 4.27%.

*Hydrochloride.*—The hydrochloride is prepared by reacting the free base with a hydrochloric acid solution in anhydrous ether in the cold. Melting point: 156° C. after recrystallization from acetic acid ethyl ester. Yield: about 95% of the theoretical yield.

Chlorine determination: Calculated: 9.55%; found: 9.27%.

*Methoiodide.*—The methoiodide is prepared by allowing the free base to stand at room temperature with an excess of methyl iodide in ethereal solution for 72 hours. Melting point: 187° C. after recrystallization from water. Yield: about 80% of the theoretical yield.

Iodine determination: Calculated: 26.6%; found: 26.9%.

*Example 13.—2-(p-butoxy phenyl)-2-piperidino methyl dioxolane-(1,3)*

10 gm. of 2-(p-butoxy phenyl)-2-bromo methyl dioxolane-(1,3) are heated in a sealed tube with 5.1 gm. of piperidine to 150–160° C. for 20 hours. The reaction mixture is worked up by following the procedure described in Example 4. Boiling point: 205–215° C./10 mm. Yield: about 74% of the theoretical yield.

Nitrogen determination: Calculated: 4.38%; found: 4.5%.

*Hydrochloride.*—The hydrochloride is prepared by reacting the free base with a hydrochloric acid solution in anhydrous ether in the cold. Melting point: 196° C. Yield: about 89% of the theoretical yield.

Chlorine determination: Calculated: 9.96%; found: 9.6%.

*Methoiodide.*—The methoiodide is prepared by allowing the free base to stand with an excess of methyl iodide at room temperature for 24 hours. Melting point: 214° C. Yield: about 83% of the theoretical yield.

Iodine determination: Calculated: 27.5%; found: 27.2%.

*Example 14.—2-(p-butoxy phenyl)-2-butylamino methyl dioxolane-(1,3)*

47.3 gm. of 2-(p-butoxy phenyl)-2-bromo methyl dioxolane-(1,3) are heated with 21.9 gm. of n-butylamine to 120° C. for 48 hours. The reaction mixture is worked up by following the procedure described in Example 4. Boiling point: 157–158° C./0.1 mm. Melting point: 76–78° C. Yield: about 84% of the theoretical yield.

*Hydrochloride.*—The hydrochloride is prepared by reacting the free base with a hydrochloric acid solution in anhydrous ether in the cold. Melting point: 204–205° C. Yield: about 91% of the theoretical yield.

Chlorine determination: Calculated: 10.3%; found: 10.4%.

*Example 15.—2-(p-isoamyloxy phenyl)-2-morpholino methyl dioxolane-(1,3)*

22 gm. of 2-(p-isoamyloxy phenyl)-2-bromo methyl dioxolane-(1,3) are heated with 11.5 gm. of pure morpholine with the addition of 1.0 gm. of calcium oxide to 150° C. for 20 hours. After cooling, the reaction mixture is worked up by following the procedure described in Example 4. Boiling point: 170–175° C./0.01 mm. Yield: about 79% of the theoretical yield.

Nitrogen determination: Calculated: 4.18%; found: 4.2%.

*Methoiodide.*—The methoiodide is prepared by boiling the free base with an excess of methyl iodide in the presence of anhydrous ether under reflux for 48 hours. Melting point: 211–212° C. after recrystallization from water. Yield: about 82% of the theoretical yield.

Iodine determination: Calculated: 26.7%; found: 27.0%.

*Example 16.—2-(p-isoamyloxy phenyl)-2-piperidino methyl dioxolane-(1,3)*

22.0 gm. of 2-(p-isoamyloxy phenyl)-2-bromo methyl dioxolane-(1,3) are heated with 11.4 gm. of piperidine in a closed reaction vessel to 150° C. for 20 hours. After cooling, the reaction mixture is worked up by following the procedure described in Example 4. Boiling point: 175–185° C./0.1 mm. Yield: about 81% of the theoretical yield.

Nitrogen determination: Calculated: 4.21%; found: 4.30%.

*Methoiodide.*—The methoiodide is prepared by boiling the free base and an excess of methyl iodide dissolved in anhydrous ether under reflux for 60 hours. Melting point: 210° C. after recrystallization from water. Yield: about 91% of the theoretical yield.

Iodine determination: Calculated: 26.8%; found: 27.1%.

*Example 17.—2-(p-isoamyloxy phenyl)-2-diethylamino methyl dioxolane-(1,3)*

22.0 gm. of 2-(p-isoamyloxy phenyl)-2-bromo methyl dioxolane-(1,3) are heated with 9.8 gm. diethylamine to 160° C. for 24 hours. The reaction mixture is worked up by following the procedure described in Example 4. Boiling point: 150–160° C./0.1 mm. Yield: about 83% of the theoretical yield.

Nitrogen determination: Calculated: 4.36%; found: 4.42%.

*Methoiodide.*—The methoiodide is prepared by allowing the free base to stand at room temperature with an excess of methyl iodide for 3 to 5 days. Melting point: 162–163° C. after recrystallization from water. Yield: about 89% of the theoretical yield.

Iodine determination: Calculated: 27.6%; found: 27.9%.

*Example 18.—2-(p-n-octyloxy phenyl)-2-morpholino methyl dioxolane-(1,3)*

37.1 gm. of 2-(p-n-octyloxy phenyl)-2-bromo methyl dioxolane-(1,3) are heated in a closed reaction vessel with 17.4 gm. of pure morpholine to 160° C. for 20 hours. The reaction mixture is worked up by following the procedure described in Example 4. Boiling point: 185–190° C./0.02 mm. Yield: about 68% of the theoretical yield.

Nitrogen determination: Calculated: 3.72%; found: 3.80%.

*Methoiodide.*—The methoiodide is prepared by allowing the free base to stand at room temperature with an excess of methyl iodide for several days. Melting point: 169–170° C. after recrystallization from ethanol. Yield: about 79% of the theoretical yield.

Iodine determination: Calculated: 24.6%; found: 25.0%.

*Example 19.—2-(p-n-octyloxy phenyl)-2-piperidino methyl dioxolane-(1,3)*

37.1 gm. of 2-(p-n-octyloxy phenyl)-2-bromo methyl dioxolane-(1,3) are heated in a closed reaction vessel with 17.0 gm. of piperidine to 150° C. for 20 hours. The reaction mixture is worked up by following the procedure described in Example 4. Boiling point: 185–190° C./0.02 mm. Yield: about 70% of the theoretical yield.

Nitrogen determination: Calculated: 3.73%; found: 3.78%.

*Methoiodide.*—The methoiodide is prepared by allowing the free base to stand at room temperature with an excess of methyl iodide for several days. Melting point: 174–175° C. after recrystallization from water. Yield: about 80% of the theoretical yield.

Iodine determination: Calculated: 24.8%; found: 25.1%.

*Example 20.—2-(p-n-octyloxy phenyl)-2-diethylamino methyl dioxolane-(1,3)*

37.1 gm. of 2-(p-n-octyloxy phenyl)-2-bromo methyl dioxolane-(1,3) are heated in a closed reaction vessel with 14.6 gm. of diethylamine to 170° C. for 45 hours. The reaction mixture is worked up by following the procedure described in Example 4. Boiling point: 170–175° C./0.02 mm. Yield: about 73% of the theoretical yield.

Nitrogen determination: Calculated: 3.86%; found: 3.95%.

*Methoiodide.*—The methoiodide is prepared by allowing the free base to stand at room temperature with an excess of methyl iodide for several days. Melting point: 108–109° C. after recrystallization from a mixture of butanol and ether (1:3). Yield: about 81% of the theoretical yield.

Iodine determination: Calculated: 25.3%; found: 25.8%.

*Example 21.—2-(p-butoxy phenyl)-2-(N-methyl-N-β-hydroxy ethyl amino) methyl dioxolane-(1,3)*

47.25 gm. of 2-(p-butoxy phenyl)-2-bromo methyl dioxolane-(1,3) are heated in an autoclave with 33.8 gm. of β-methylamino ethanol to 150° C. for 24 hours. After cooling, the reaction mixture is worked up by following the procedure described in Example 4. Boiling point: 178–179° C./0.08 mm. Yield: about 74% of the theoretical yield.

Nitrogen determination: Calculated: 4.54%; found: 4.8%.

Said compound can be converted into 2-(p-butoxy phenyl)-2-(N-methyl-N-β-chloro ethylamino) methyl dioxolane-(1,3) by reaction with slightly more than 1 mol of thionylchloride in chloroform solution while cooling with ice.

*Hydrochloride.*—The hydrochloride of said 2-(p-butoxy phenyl)-2-(N-methyl-N-β-chloro ethylamino)methyl dioxolane-(1,3) is prepared in the same manner as described in the preceding examples. Melting point: 203–204° C. after recrystallization from acetic acid methyl ester.

Chlorine determination: Total chlorine calculated: 19.5%; found: 19.31%. Hydrochloride chlorine calculated: 9.76%; found: 9.66%.

*Example 22.—2-(p-butoxy phenyl)-2-(N-butyl-N-β-hydroxy ethyl amino) methyl dioxolane-(1,3)*

47.25 gm. of 2-(p-butoxy phenyl)-2-bromo methyl dioxolane-(1,3) are heated with 44.0 gm. of β-n-butyl-amino ethanol to 160–165° C. for 25 hours. After cooling, the reaction mixture is worked up by following the procedure described in Example 4. Boiling point: 190–195° C./0.07 mm. Yield: about 60% of the theoretical yield.

Nitrogen determination: Calculated: 4.0%; found: 4.29%.

*Example 23.—2-(p-butoxy phenyl)-2-(N-benzyl-N-β-hydroxy ethyl amino) methyl dioxolane-(1,3)*

Equal parts by weight of 2-p-butoxy phenyl)-2-bromo methyl dioxolane-(1,3) and β-benzyl amino ethanol are heated to 160–165° C. for 24 hours. After cooling, the reaction mixture is worked up by following the procedure described in Example 4. Boiling point: 195–200° C./0.02 mm. with decomposition. Yield: about 58% of the theoretical yield.

Nitrogen determination: Calculated: 3.63%; found: 3.48%.

*Example 24.—2-(p-butoxy phenyl)-2-(N-methyl-N-cyclohexyl amino)methyl dioxolane-(1,3)*

34 gm. of p-butoxy-ω-(N-methyl-N-cyclohexyl) amino acetophenone hydrochloride are suspended in 200 cc. of benzene. 8 gm. of ethylene glycol and 1 gm. of p-toluene sulfonic acid are added to said suspension. The mixture is heated under reflux for 30 hours while stirring. The water formed during the reaction is continuously removed by providing a water separator and passing the distilled azeotropic mixture of benzene and water through said water separator before returning the benzene into the reaction vessel. After cooling, water is added to the reaction mixture and the mixture is shaken vigorously. The benzene layer is separated from the aqueous layer which is filtered over activated charcoal to yield a clear filtrate. Said filtrate is rendered alkaline by the addition of sodium hydroxide solution. The oil precipitated thereby is extracted with ether. The ethereal solution is washed with water to neutral reaction, dried over anhydrous sodium sulfate, and evaporated to dryness. The residue is distilled in a vacuum. Boiling point: 190–194° C./0.02 mm. Yield: about 55% of the theoretical yield.

Nitrogen determination: Calculated: 4.0%; found: 4.2%.

*Example 25.—2-(p-butoxy phenyl)-2-morpholino methyl dioxolane-(1,3) methobromide*

37 gm. of p-butoxy-ω-morpholino acetophenone methobromide are suspended in 250 cc. of anhydrous benzene. 8 gm. of ethylene glycol and a few drops of phosphoric acid are added to said suspension. The mixture is heated under reflux for 15 to 20 hours. The water formed during the reaction is continuously removed by providing a water separator and passing the distilled azeotropic mixture of benzene and water through said water separator before returning the benzene into the reaction vessel. After cooling, the precipitate is filtered off by suction and is recrystallized from a mixture of ethanol and acetic acid ethyl ester (1:2). Melting point: 202° C. with decomposition. Yield: about 67% of the theoretical yield. The compound is identical with that produced according to Example 10.

Bromine determination: Calculated: 19.2%; found: 19.6%.

In place of the various 2-phenyl and 2-alkoxy phenyl-2-bromo methyl dioxolane-(1,3) compounds used in Examples 1 to 25, there can be employed as one reaction component equimolecular amounts of other 2-aryl-2-halogeno methyl dioxolane-(1,3) compounds such as, for instance:

2-(o-methoxy phenyl)-2-bromo methyl dioxolane-(1,3)
2-(o-ethoxy phenyl)-2-iodo methyl dioxolane-(1,3)
2-(o,p-dimethoxy phenyl)-2-bromo methyl dioxolane-(1,3)
2-(m-hydroxy phenyl)-2-bromo methyl dioxolane-(1,3)
2-(o,p-dihydroxy phenyl)-2-iodo methyl dioxolane-(1,3)
2-(o-n-decyloxy phenyl)-2-bromo methyl dioxolane-(1,3)
2-(p-2'-methyl-1'-pentyloxy phenyl)-2-bromo methyl dioxolane-(1,3)
2-(p-3',3'-dimethyl-1'-butyloxy phenyl)-2-bromo methyl dioxolane-(1,3)
2-(p-3'-ethyl-2'-pentyloxy phenyl)-2-bromo methyl dioxolane-(1,3)
2-(o,m-dihydroxy phenyl)-2-bromo methyl dioxolane-(1,3)
2-(o,p-di-n-butoxy phenyl)-2-bromo methyl dioxolane-(1,3)
2-(o-methoxy phenyl)-2-bromo methyl-4-ethyl dioxolane-(1,3)
2-phenyl-2-bromo methyl-4-isopropyl dioxolane-(1,3)
2-(p-hydroxy phenyl)-2-bromo methyl-4-n-butyl dioxolane-(1,3) and others.

In place of the various alkylamines and hydrogenated heterocyclic amines used as the other reaction component in Examples 1 to 25, there can be employed equimolecular amounts of other amines of the Formula IV

such as, for instance, dimethylamine, di-n-propylamine, isopropylamine, di-n-butylamine, isobutylamine, di-secondary butylamine, ethanolamine, di-ethanolamine, n-propanolamine, N-isopropyl ethanolamine, cyclopentylamine, cyclohexylamine, 2-methyl cyclohexylamine, N-n-butyl-N-cyclohexylamine, benzylamine, β-phenyl ethylamine, p-methyl benzylamine, pyrrolidine, 2,4-dimethyl pyrrolidine, 4-methyl piperidine, and others.

Substitution of the halogen atom Y in such 2-aryl-2-halogeno methyl dioxolane-(1,3) compounds by the amino group of such amines is effected by following the procedure described in said Examples 1 to 25.

Other acid addition salts than the hydrochlorides disclosed in the preceding examples can be produced by employing, in place of hydrochloric acid, equimolecular amounts of other acids for the addition reaction such as, for instance, hydrobromic acid, hydroiodic acid, phosphoric acid, sulfuric acid, nitric acid, and others; or organic acids such as, for instance, formic acid, acetic acid, propionic acid, valeric acid, oxalic acid, malonic acid, maleic acid, succinic acid, citric acid, tartaric acid, malic acid, cyclohexyl acetic acid, cyclopentyl propionic acid, benzoic acid, phthalic acid, salicyclic acid, furoic acid, pyrrolidine-2-carboxylic acid, pyrazol-3-carboxylic acid, nicotinic acid, isonicotinic acid and others.

In place of the quaternizing agents methyl bromide, methyl iodide, ethyl bromide, and dimethyl sulfate as they are used in the preceding examples, there can be employed equimolecular amounts of other quaternizing agents such as, for instance, n-propyl iodide, isopropyl bromide, n-butyl bromide, cyclopentyl iodide, cyclohexyl bromide, isobutyl bromide, secondary butyl bromide, benzyl bromide, β-phenyl ethyl bromide, 3-phenyl propyl bromide, diethyl sulfate, p-toluene sulfonic acid alkyl esters, and others.

As stated hereinabove, the new compounds, and especially the quaternary ammonium compounds, have a selective activity upon vagal ganglia and have no or only a slight effect upon the sympathetic ganglia. They can be administered orally or parenterally, i. e., subcutaneously, intramuscularly, or intravenously, and have proved to be useful in therapy in suppressing parasympathetically induced hypersecretions and especially gastric secretions.

For therapeutical administration the new 2-aryl-2-amino methyl dioxolane-(1,3) compounds and their acid addition salts and quaternary ammonium compounds are preferably diluted with a suitable pharmaceutical carrier. Such a carrier may be either a solid material or an injectable liquid such as water or physiological salt solution.

Pharmacological tests, for instance with 2-(p-butoxy phenyl)-2-morpholino methyl dioxolane-(1,3) methobromide, have shown that said compound has substantially no antihistaminic activity. Said methobromide is capable, for instance, of completely suppressing the blood pressure reducing effect of electric irritation of the vagus nerve in a dose of 0.3 mg. to 0.5 mg. per kg. body weight.

Of course many changes and variations in the reactants employed, in the reaction conditions, temperature, pressure and duration, in the solvents used, in the methods employed for isolating and purifying the reaction products, and the like, may be made by those skilled in the art in accordance with the principles set forth herein and in the claims annexed hereto.

We claim:

1. 2-aryl-2-aminomethyl-dioxolane-(1,3) compounds selected from the group consisting of 2-aryl-2-aminomethyl-dioxolanes-(1,3) of the formula

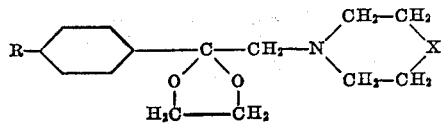

and their quaternary ammonium compounds of the formula

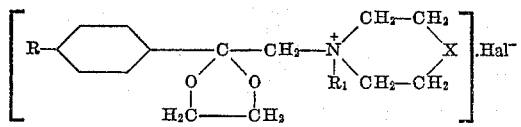

wherein:
R is alkoxy with 1 to 10 carbon atoms,
R₁ is alkyl with 1 to 4 carbon atoms,
X is selected from the group consisting of oxygen and methylene, and
Hal is a halogen having an atomic weight greater than 35.

2. 2-(p-butoxy phenyl)-2-morpholino methyl dioxolane-(1,3) methobromide.

3. 2-(p-butoxy phenyl)-2-morpholino methyl dioxolane-(1,3).

4. 2-(p-butoxy phenyl)-2-piperidino methyl dioxolane-(1,3).

5. 2-(p-isoamyloxy phenyl)-2-piperidino methyl dioxolane-(1,3).

6. 2-(p-n-octyloxy phenyl)-2-piperidino methyl dioxolane-(1,3).

7. The process of producing 2-aryl-2-aminomethyl-dioxolane-(1,3) compounds selected from the group consisting of 2-aryl-2-aminomethyl-dioxolanes-(1,3) of the formula

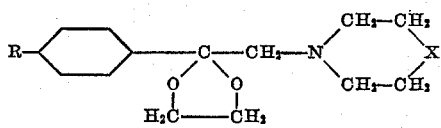

and their quaternary ammonium compounds of the formula

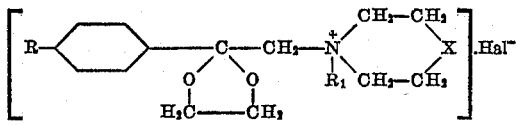

wherein:
R is alkoxy with 1 to 10 carbon atoms,
X is selected from the group consisting of oxygen and methylene, and
Hal is a halogen having an atomic weight greater than 35,
which comprises heating a 2-aryl-2-halomethyl-dioxolane-(1,3) of the formula
R₁ is alkyl with 1 to 4 carbon atoms,

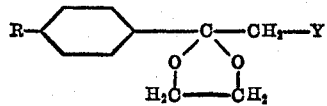

wherein R has the meaning defined above and Y is halogen, with a heterocyclic amine of the formula

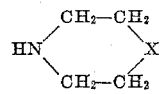

wherein X has the meaning above defined, and, for formation of the quaternary ammonium compounds, reacting the resulting 2-aryl-2-aminomethyl-dioxolane-(1,3) compound with a haloalkyl compound of the formula

wherein R₁ and Hal have the meaning above defined.

8. The process according to claim 7, wherein between 2 and 5 mols of the amine are present for each mol of the 2-aryl-2-halogeno methyl dioxolane-(1,3).

9. The process according to claim 7, wherein the amine is reacted with the 2-aryl-2-halogeno methyl dioxolane-(1,3) at a temperature between about 100° C. and about 200° C.

10. The process according to claim 7, wherein the amine is reacted with the 2-aryl-2-halogeno methyl dioxolane (1,3) at a temperature between 140° C. and 170° C.

11. The process according to claim 7, wherein the 2-aryl-2-halogeno methyl dioxolane-(1,3) is reacted with the amine in the presence of an organic solvent.

12. The process according to claim 7, wherein the 2-aryl-2-halogeno methyl dioxolane-(1,3) is reacted with the amine in the presence of an organic solvent and under pressure.

13. The process according to claim 7, wherein the 2-aryl-2-halogen methyl dioxolane-(1,3) is reacted with the amine in the presence of an acid binding agent.

14. The process according to claim 7, wherein 2-(p-butoxyphenyl)-2-bromomethyl-dioxolane-(1,3) is reacted with morpholine at a temperature between 140 to 150° C., the ratio of dioxolane compound to morpholine being between 0.2:1 and 0.25:1.

References Cited in the file of this patent
UNITED STATES PATENTS
2,439,969    Fourneau _____ Apr. 20, 1948

OTHER REFERENCES
Bogert et al.: Journal Amer. Chem. Soc., vol. 55, pp. 3741–45 (1933).
Fourneau: Chem. Abst., vol. 40, pages 6465–67 (1946).
Hansorth: Angew. Chem., vol. 64, pages 544–553 (1952).

U. S. DEPARTMENT OF COMMERCE

PATENT OFFICE

CERTIFICATE OF CORRECTION

Patent No. 2,830,988     Heinz Scheffler et al.     April 15, 19

It is hereby certified that error appears in the printed specification of the above numbered patent requiring correction and that the said Letters Patent should read as corrected below.

Column 6, line 5, for "4.30%" read -- 4.78% --; column 10, line 60, for "2-p-butoxy phenyl)-2-" read -- 2-(p-butoxy phenyl)-2- --; column 13, line 50, strike out "$R_1$ is alkyl with 1 to 4 carbon atoms," and insert the same between lines 43 and 44, same column.

Signed and sealed this 10th day of June 1958.

(SEAL)
Attest:

KARL H. AXLINE
Attesting Officer

ROBERT C. WATSON
Commissioner of Patents